(12) United States Patent
Melrose (10) Patent No.: US 7,889,453 B2
(45) Date of Patent: Feb. 15, 2011

(54) REPEATED RUNOUT ERROR COMPENSATION USING ITERATIVE FEEDBACK

(75) Inventor: Thomas O. Melrose, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 362 days.

(21) Appl. No.: 11/939,648

(22) Filed: Nov. 14, 2007

(65) Prior Publication Data

US 2009/0122440 A1 May 14, 2009

(51) Int. Cl.
G11B 5/596 (2006.01)
(52) U.S. Cl. .................................. 360/77.04
(58) Field of Classification Search ........................ None
See application file for complete search history.

(56) References Cited

U.S. PATENT DOCUMENTS

| | | | |
|---|---|---|---|
| 6,545,835 B1 * | 4/2003 | Codilian et al. | 360/77.04 |
| 6,608,731 B2 | 8/2003 | Szita | |
| 6,654,198 B2 | 11/2003 | Liu et al. | |
| 6,707,635 B1 * | 3/2004 | Codilian et al. | 360/77.04 |
| 6,785,084 B2 * | 8/2004 | Szita | 360/77.04 |
| 6,831,803 B2 * | 12/2004 | Hsin | 360/77.04 |
| 6,847,503 B2 * | 1/2005 | Zhang et al. | 360/77.04 |
| 6,924,959 B1 * | 8/2005 | Melkote et al. | 360/77.04 |
| 6,965,491 B1 | 11/2005 | Perlmutter et al. | |
| 7,054,096 B1 | 5/2006 | Sun et al. | |
| 7,088,547 B1 * | 8/2006 | Wang et al. | 360/77.04 |
| 7,106,542 B1 * | 9/2006 | Sun et al. | 360/77.04 |
| 7,106,547 B1 | 9/2006 | Hargarten et al. | |
| 7,151,645 B2 * | 12/2006 | Won et al. | 360/77.04 |
| 7,167,336 B1 * | 1/2007 | Ehrlich et al. | 360/77.04 |
| 7,315,431 B1 * | 1/2008 | Perlmutter et al. | 360/77.04 |
| 7,330,331 B2 * | 2/2008 | Zhang | 360/77.04 |
| 7,457,075 B2 * | 11/2008 | Liu et al. | 360/77.04 |
| 7,477,473 B2 * | 1/2009 | Patapoutian et al. | 360/77.04 |
| 7,489,469 B2 * | 2/2009 | Sun et al. | 360/77.04 |
| 7,525,754 B2 * | 4/2009 | Melrose et al. | 360/77.04 |
| 7,561,370 B2 * | 7/2009 | Melrose et al. | 360/77.04 |
| 7,589,930 B2 * | 9/2009 | Hanson et al. | 360/77.04 |
| 2003/0133220 A1 * | 7/2003 | Hsin | 360/77.04 |
| 2007/0096678 A1 * | 5/2007 | Melrose | 318/652 |
| 2008/0239555 A1 * | 10/2008 | Ehrlich et al. | 360/77.08 |
| 2009/0086364 A1 * | 4/2009 | Gerasimov | 360/77.04 |

* cited by examiner

*Primary Examiner*—Hoa T Nguyen
*Assistant Examiner*—James L Habermehl
(74) *Attorney, Agent, or Firm*—Fellers, Snider, et al.

(57) ABSTRACT

Various embodiments of the present invention are generally directed to adaptively determining an updated repeated runout (RRO) correction value to correct for RRO error in the placement of a servo seam, by iteratively combining a weighted initially estimated RRO correction value for the seam with a position error signal (PES).

20 Claims, 9 Drawing Sheets

REPEATED RUNOUT ERROR COMPENSATION USING ITERATIVE FEEDBACK

BACKGROUND

The present case is generally directed to data storage, and more particularly, to improving servo control for a data storage medium.

Repeated runout (RRO) error in servo data can generally have an adverse affect on servo control of a control object, such as a transducer adjacent a storage medium. RRO correction values can be determined to compensate for such RRO errors, but the determination of such values can be time and resource intensive, particularly in high volume automated manufacturing environments.

SUMMARY

Various embodiments of the present invention are generally directed to adaptively determining an updated repeated runout (RRO) correction value to correct for RRO error in the placement of a servo seam, by iteratively combining a weighted, initially estimated RRO correction value for the seam with a position error signal (PES).

In accordance with some embodiments, a method generally comprises determining an estimated runout correction value corresponding to a position of a transducer over a servo seam on a storage medium, said estimated runout correction value configured to reduce repeated runout error associated with a location of the servo seam on the storage medium; obtaining a position error signal indicative of an error in the position of the transducer relative to the servo seam; and combining the estimated runout correction value with the position error signal to determine an updated runout correction value.

In accordance with other embodiments, a method generally comprises determining an estimated repeatable runout (RRO) correction value corresponding to a position of a transducer over a servo seam on a storage medium; initializing an iterative correction system with the estimated RRO correction value; and suppressing error in the estimated RRO correction value with the iterative correction system using input from the transducer over the storage medium.

In accordance with other embodiments, an apparatus generally comprises a servo controller configured to position a transducer adjacent a rotatable storage medium in relation to an updated repeatable runout (RRO) correction value. The servo controller generates the updated RRO correction value by determining an estimated runout correction value corresponding to a position of the transducer over a servo seam on the medium, obtains a position error signal indicative of an error in the position of the transducer relative to the servo seam, and combines the estimated runout correction value with the position error signal to determine an updated runout correction value.

DETAILED DESCRIPTION

Figure 1:
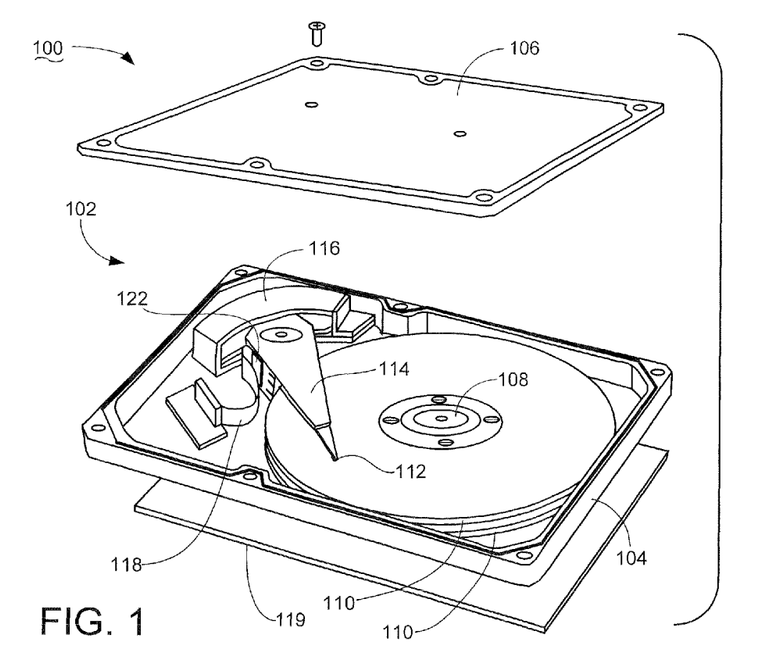
FIG. 1 is an exploded isometric view of an exemplary data storage device in which various embodiments of the present invention can be advantageously practiced.

FIG. 1 provides a top plan view of a data storage device 100. The device 100 is characterized as a hard disc drive and is provided to show an exemplary application in which various embodiments of the present invention may be utilized. It will be understood, however, that the claimed invention is not so limited.

The device 100 includes a housing 102 formed from a base deck 104 and top cover 106. A spindle motor 108 rotates a number of storage media 10 at a constant high speed. The media 110 are accessed by a corresponding array of data transducers 112 supported by a movable actuator 114. The actuator 114 pivots via a voice coil motor 116 to align the transducers 112 with tracks defined on the media surfaces. A flex circuit assembly 118 provides electrical communication paths between the actuator 114 and device control electronics on an externally disposed printed circuit board (PCB) 119.

Figure 2:
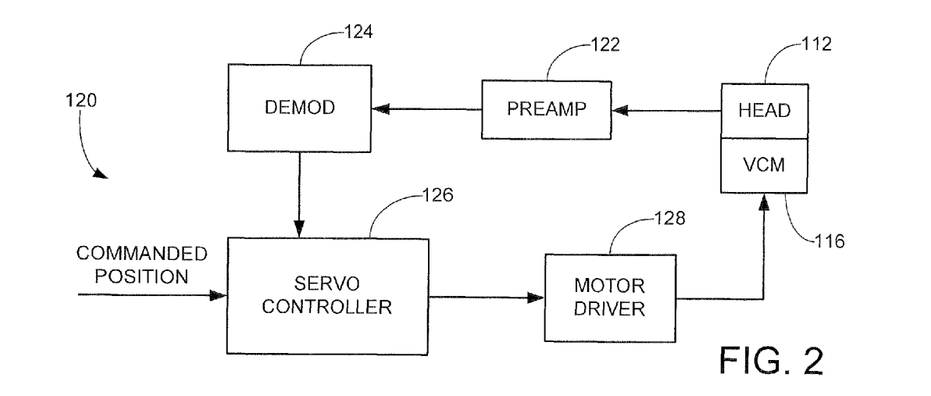
FIG. 2 provides a functional representation of a closed loop servo control circuit of the device of FIG. 1.

FIG. 2 provides a generalized functional block diagram for a closed loop servo control circuit 120 of the device 100. Embedded servo data are transduced from the media 110 by a selected transducer (head) 112 and provided to a preamplifier/driver (preamp) circuit 122.

The preamp circuit 122 preamplifies and filters the readback signals from the transducer 112, and provides the processed servo data to a demodulation (demod) circuit 124. The demod circuit 124 operates to detect and conditions the servo data, including application of automatic gain control (AGC) and conversion of the signals to digital form.

A servo controller 126 processes the digitized servo data to generate a current command signal that is supplied to a motor driver circuit 128. In response, the driver circuit 128 applies the appropriate current to the VCM 116 to position the transducer 112. The servo controller 126 is preferably characterized as a programmable processor with associated servo code to direct the operation of the servo loop, although the servo controller 126, or portions thereof, can alternatively be realized in hardware.

Figure 3:
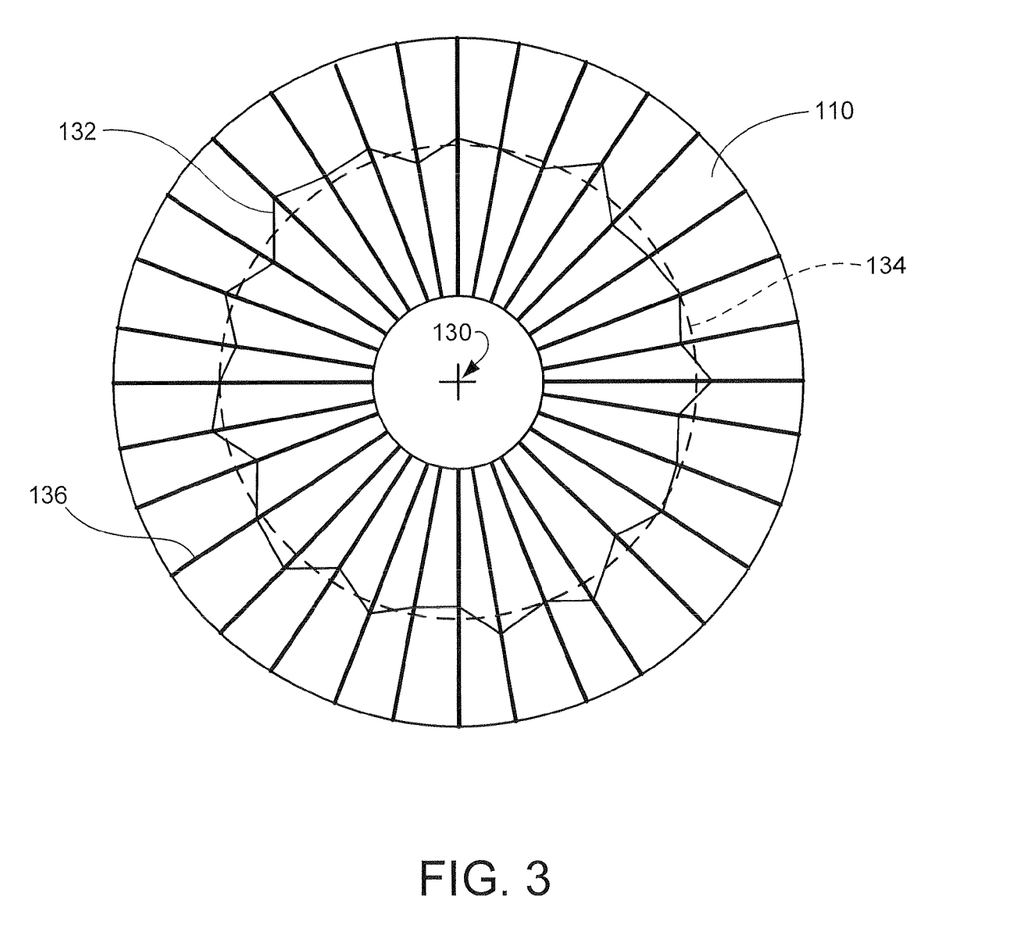
FIG. 3 is a top down diagrammatic view of a data storage medium of the device of FIG. 1.

FIG. 3 provides a top down diagrammatic view of a selected magnetic storage medium 110 of the device 100 of FIG. 1. The medium 110 is preferably substantially circular in shape and includes a central rotational axis 130.

The medium 110 is contemplated as including plurality of concentric data tracks to which user data are stored. For purposes of illustration, only a single data track 132 is shown, with an exaggerated amount of perturbation (repeated runout error, or RRO). The RRO is induced by errors in the placement of servo data that would otherwise nominally define an ideal circular path on the medium 110, as indicated by track 134.

The servo data are preferably arranged as a series of spaced apart servo wedges 136 that radially extend across the media 110 like spokes of a wheel to provide embedded servo sectors along the track 134. It will be recognized that FIG. 3 is a simplified diagram, in that a larger number of servo sectors per track, such as in the range of 200-400, may actually be used.

Figure 4:
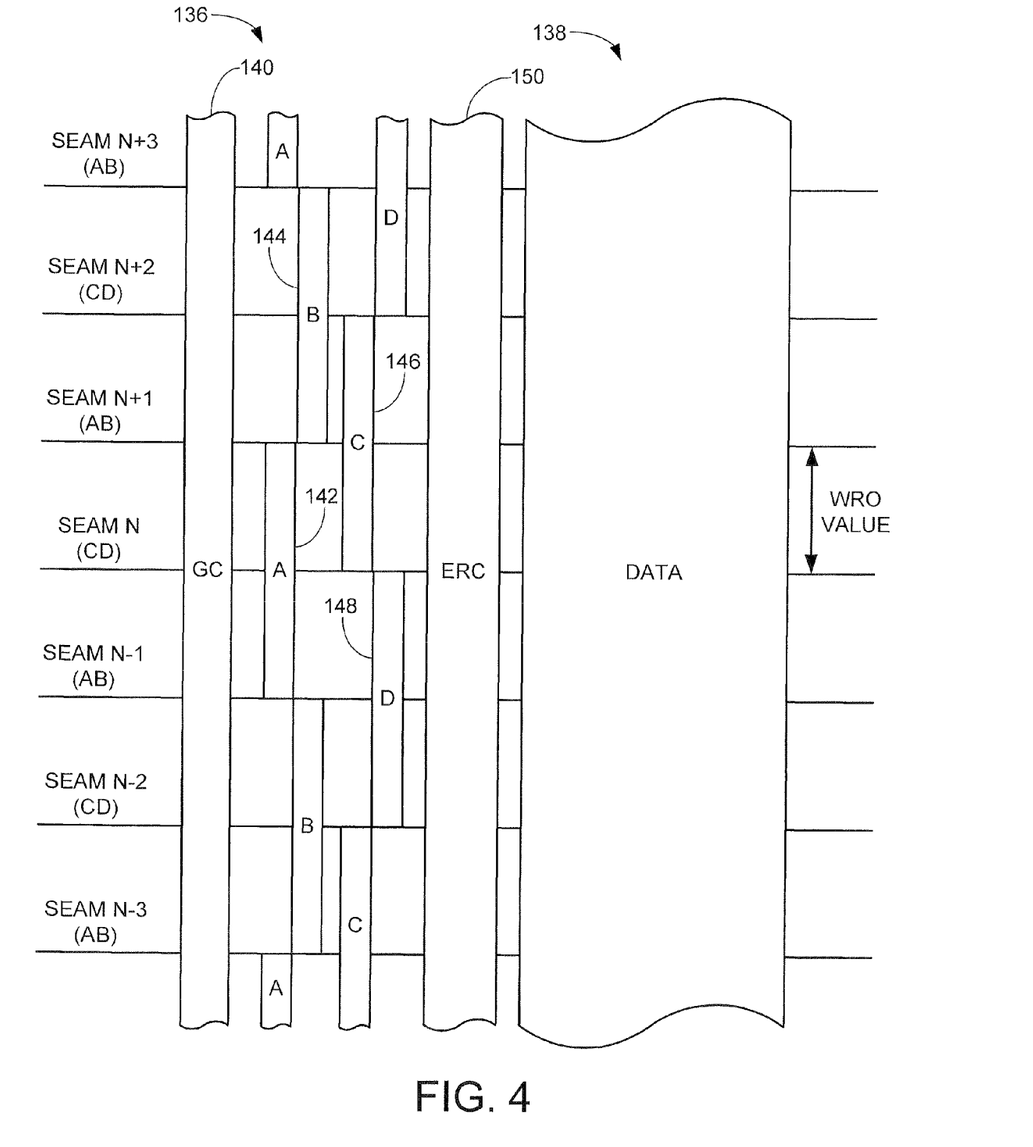
FIG. 4 generally represents portions of the data storage medium with ideally placed servo seams.

Portions of one of the servo wedges 136 are shown in greater detail in FIG. 4. FIG. 4 also shows an adjacent user data region to which user data are stored at 138.

The servo data are shown to preferably include a Gray code (GC) block 140 to provide track addressing information to the servo circuit 120. Servo burst blocks (also referred to as dibit patterns and servo burst patterns) are identified as A, B, C, D patterns 142, 144, 146 and 148. The patterns provide fine positional information to the servo circuit 120. An embedded runout correction (ERC) block is shown at 150 and is used to store ERC values as explained below.

While a quadrature (ABCD) pattern is shown in FIG. 4, this is merely exemplary in nature, as any number of different servo formats and arrangements can be utilized as desired. The servo data are preferably written during device manufacturing using a servo track writer (STW), although the device can alternatively use a self-servo write process (with or without seed tracks from an STW) to generate the servo data.

A number of servo seams are denoted from N−3 to N+3. Each servo seam nominally represents a junction, or seam, between adjacent bursts of the ABCD patterns; for example, seam N is at a CD junction, seam N+1 is at the next radial AB junction, and so on. Preferably, each seam will be nominally aligned at the same radial position in each of the servo spokes 136 around the circumference of the medium 110, thereby defining an ideal circular path such as represented by ideal track 134 in FIG. 2.

A written in runout (WRO) value generally relates to the radial distance between the actual locations of each pair of adjacent seams. The servo write process preferably attempts to provide the same target WRO value for each pair of adjacent seams, so that the data nominally match that shown in FIG. 4.

During device operation, the associated transducer reads the servo burst patterns as the medium 110 rotates adjacent the transducer. The recovered burst data are demodulated and fed into the servo loop to provide an indication of the actual location of the transducer 112 with respect to the adjacent seams.

A position error signal (PES) is generated in relation to the error between the actual position and a commanded position, and a correction signal is output to the VCM driver to minimize the PES. Preferably, the servo controller provides 256 steps, or increments, across each WRO interval, and relies on the WRO being nominally consistent in order to provide a nominally linear PES.

Accordingly, it will be appreciated that errors in the locations of the servo seams can induce RRO and non-linearities in the operation of the servo circuit 120, thereby causing RRO disturbances in the positioning of the transducer. Exemplary types of seam errors are generally depicted in FIG. 5.

Figure 5:
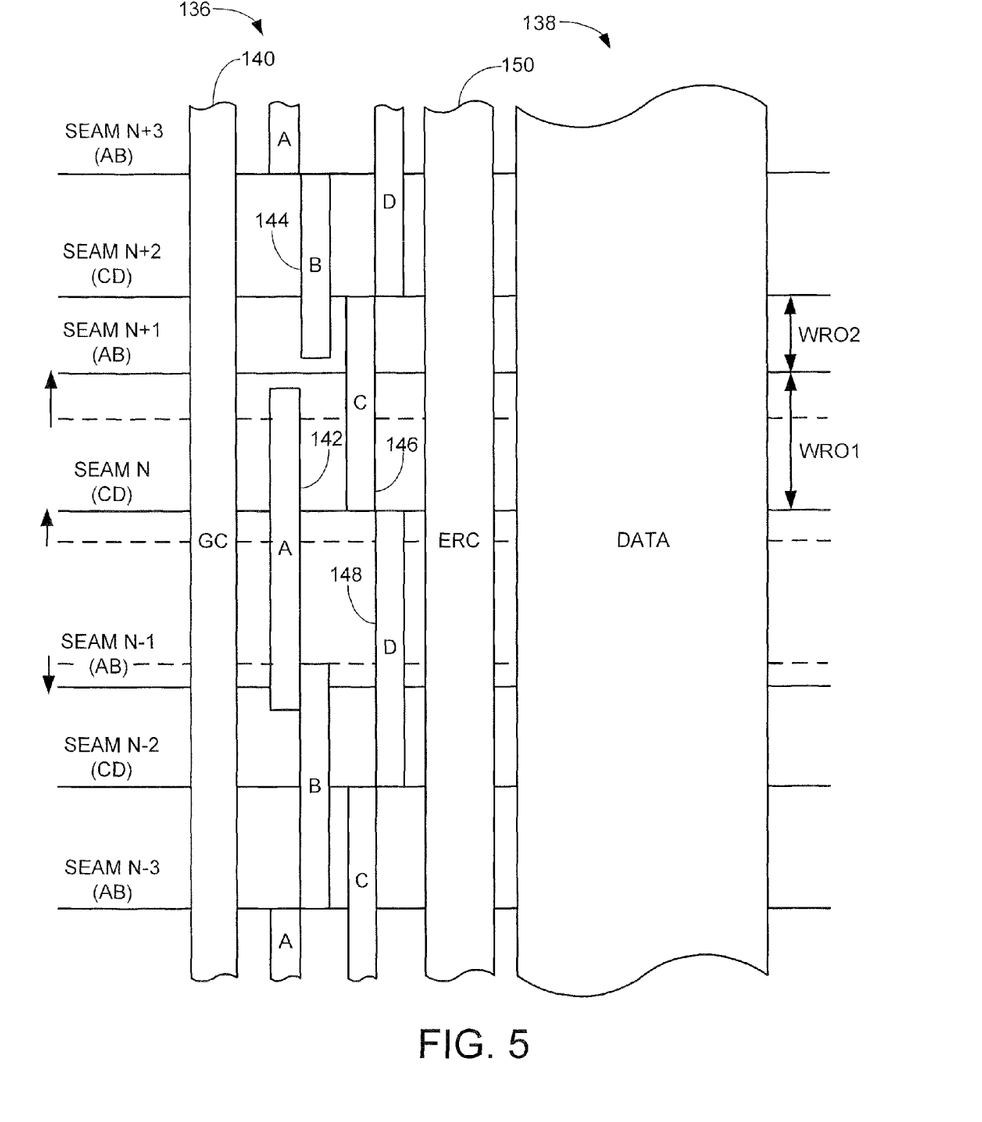
FIG. 5 correspondingly represents portions of the data storage medium with misplaced seams.

For example, seam N for the selected spoke 136 in FIG. 5 is shown to be displaced upwardly (i.e., toward the center 130 of the medium 110) as compared to the ideal location for this seam from FIG. 4 (shown in broken line fashion). The associated CD patterns 146, 148 at seam N still meet at their respective corners, but the junction is displaced from the desired location.

Seam N+1 for the selected spoke 136 is also displaced upwardly, but a gap is provided between the associated AB patterns 142, 144. Seam N−1 is displaced downwardly (away from center 130), and the associated C pattern 146 overlaps the associated D pattern 148. It is contemplated that other types of placement errors can readily occur apart from those exemplified in FIG. 5. It is further contemplated that similar types of errors may also be present in the remaining servo spokes along a given seam around the medium 110, resulting in RRO as previously depicted in FIG. 3.

It can be seen that the WRO values for the seams illustrated in FIG. 5 deviate from those of FIG. 4; for example, a WRO1 value between seams N and N+1 for the spoke 136 in FIG. 5 is larger than the nominal WRO value, while a WRO2 value between seams N+1 and N+2 is smaller than the nominal WRO value. Because the WRO between seams now differs, the servo gains at the location of the altered WRO may also be non-linear, provide sub-optimal position control results.

Errors in servo bursts and seam placement accordingly require correction on the part of the servo controller 126 (FIG. 1) in order to accurately place the transducer 112 over the actual desired radial location on the medium 110. In a preferred embodiment, the ERC fields 150 store a correction value for each seam generally indicative of a radial offset between an actual position and a desired position of the associated seam. The radial offsets can be expressed, for example, in terms of a number of correction steps needed to advance the transducer from the actual location of the seam to the desired location.

Figure 6:
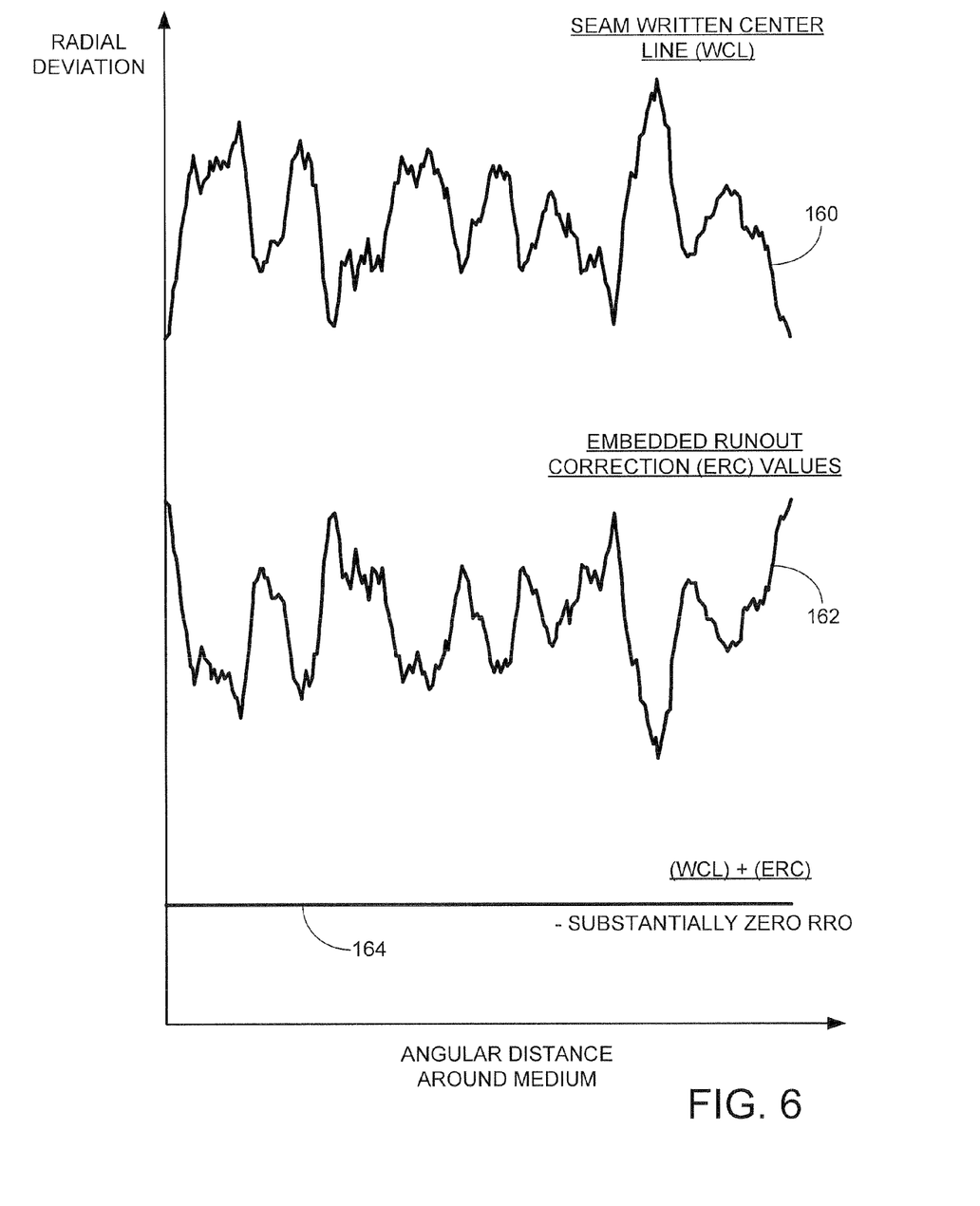
FIG. 6 is a diagram of the relationship between an embedded runout correction signal and a written centerline of a servo track.

FIG. 6 generally illustrates the relationship between a written centerline of a servo track with repeated runout error (RRO) and corresponding embedded runout correction (ERC) values that can be used to compensate such RRO. An exemplary written centerline is denoted at 160, and a corresponding ERC signal is denoted at 162. It can be seen in FIG. 6 that the written centerline may not be straight, and in many cases will not be, as with the non-circular track 132 depicted in FIG. 5.

As described, an embedded runout correction (ERC) field is preferably provided in one or more servo wedges on the medium 110. As was shown in FIG. 3, the ERC field 150 may be placed at any suitable location within the wedge(s) accessible by the transducer 112. Preferably, the value of the ERC field 150 at a particular location on the medium 110 will approximate the opposite of the value of the error in the written centerline.

In FIG. 6 with the ERC and the written centerline both expressed as a percentage of track width, the preferred equal and opposite relationship between the two values can be seen. A transducer 112 may determine both a written centerline and an embedded runout correction while traveling across a servo wedge such as that shown in FIG. 3. Combining these values enables the transducer to follow a nominally concentric path along the medium, as generally depicted at 164.

As described with respect to FIG. 3, the distance between dibit seams can also be determined by the transducer. This may be used to determine the written in runout (WRO), which as noted above is a measure of the variation of distance between adjacent seams.

The written centerlines of the tracks are preferably indicated by the burst field. Referring again to FIG. 3, a seam is preferably defined where the A burst trims the B burst, then again where the B burst trims the A burst. Similarly, two additional seams will be defined where the D burst trims the C burst and where the C burst trims the D burst. Although a quadrature pattern is utilized in the present example, it is understood that other embodiments may have more or fewer specific and distinct burst types.

Figure 7:
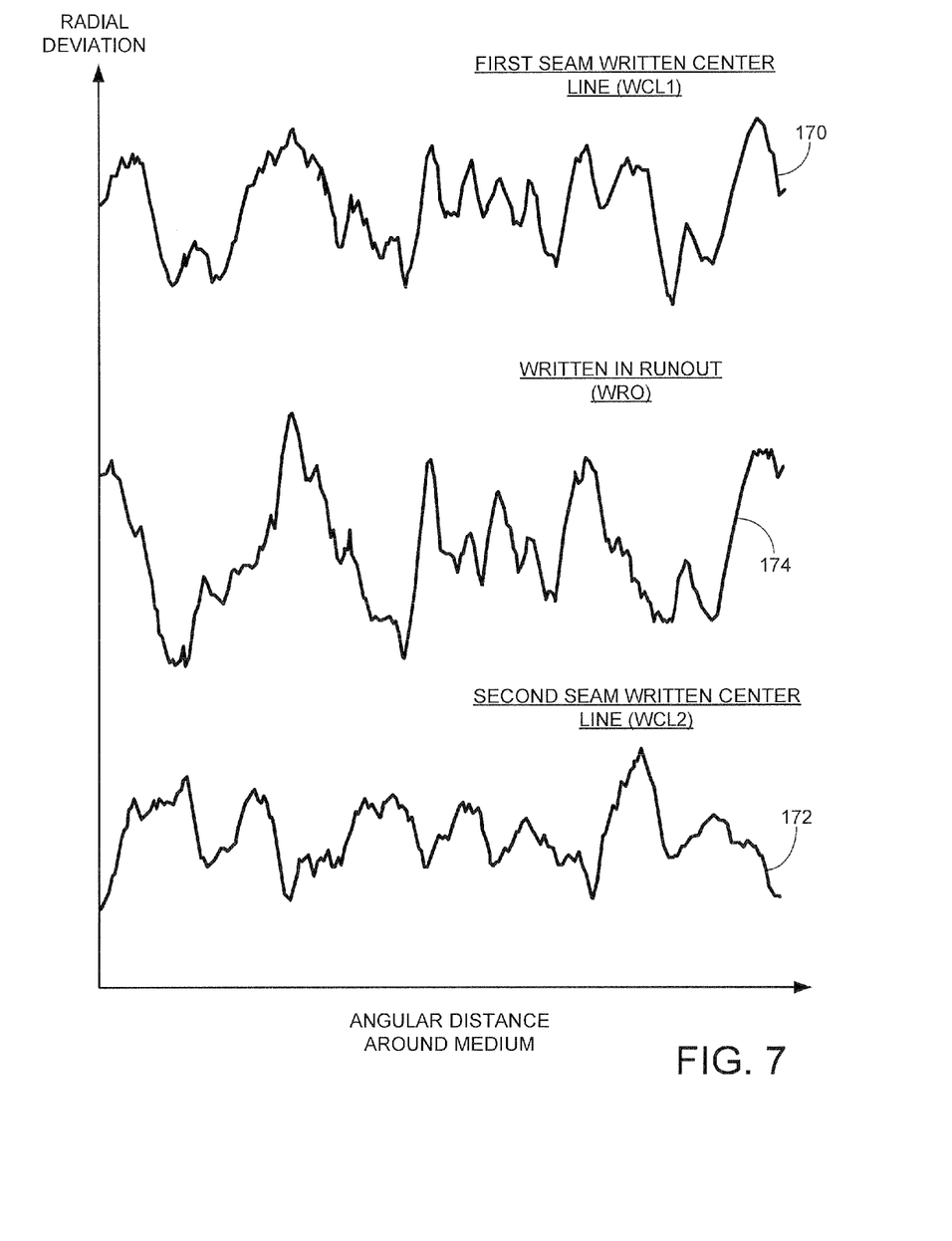
FIG. 7 is a diagram illustrating the written centerlines of two servo tracks and the written in runout between the tracks.

Referring now to FIG. 7, a diagram illustrating the written centerlines of two servo tracks and the written in runout between the tracks is shown. The WRO is preferably defined as the distance between the exemplary seams minus the average seam spacing.

The average seam spacing is preferably a property of the medium 110 itself. The average seam spacing may be determined by dividing the number of seams by the radius of the medium. However, the distance between individual seams may vary depending upon how accurately the written centerlines have been laid down on the medium. FIG. 7 illustrates graphically the relationship between WRO and two exemplary seams.

FIG. 7 shows respective first and second seam written center lines 170, 172 for respectively adjacent first and second seams. The center lines 170, 172 are denoted as WCL1 and WCL2 and are contemplated as corresponding to the Seam N and Seam N+1 of FIGS. 4-5, respectively. Corresponding Written in Runout (WRO) values are shown at 176 and are generally indicative of a radial separation distance between the adjacent seams (WCLs) 170, 172. The WRO values 176 are preferably determined in relation to the actual radial distance R between the adjacent seams and an average distance between the seams AVG, such as in accordance with the following relationship:

$$WRO = R - AVG \quad (1)$$

The relationship between the written centerline, the seam spacing, and the WRO facilitates the efficient processing of the ERC correction values for a particular medium 110. With knowledge of the WCL of a first seam (such as the WCL1 170 in FIG. 7) and knowledge of the WRO between that seam and a second seam (such as WRO 174 in FIG. 7), the $WCL_2$, and hence the $ERC_2$, for the second seam can be readily determined. For example, this relationship can be expressed as follows:

$$ERC_2 \approx ERC_1 + WRO_{12} \quad (2)$$

where $ERC_2$ is the correction value for the second seam, $ERC_1$ is the correction value for the first seam, and $WRO_{12}$ is the WRO between the first and second seams.

As described, the written centerline of a seam is preferably equal and opposite to the value of the ERC correction field for the seam. As noted above, the written in runout (WRO) is the distance between the first two seams minus the average seam spacing. Thus, the WRO approximately equals the change in the ERC of the adjacent seams. This makes it possible to predict an ERC (RRO correction) value for a second seam based on the ERC value of a first seam and the WRO between the two seams. Indeed, estimated ERC values can be propagated across the entire radius of the medium 110 if the WRO values between each pair of adjacent seams is known.

While operable, a limitation with this approach is that errors in the initial ERC value for the first seam, as well as errors in the WRO estimates, can propagate across the resulting estimated ERC values for the remaining seams. Accordingly, various embodiments of the present invention are generally directed to reducing such propagated errors, thereby increasing the accuracy of the estimated ERC values for the seams.

Figure 8:
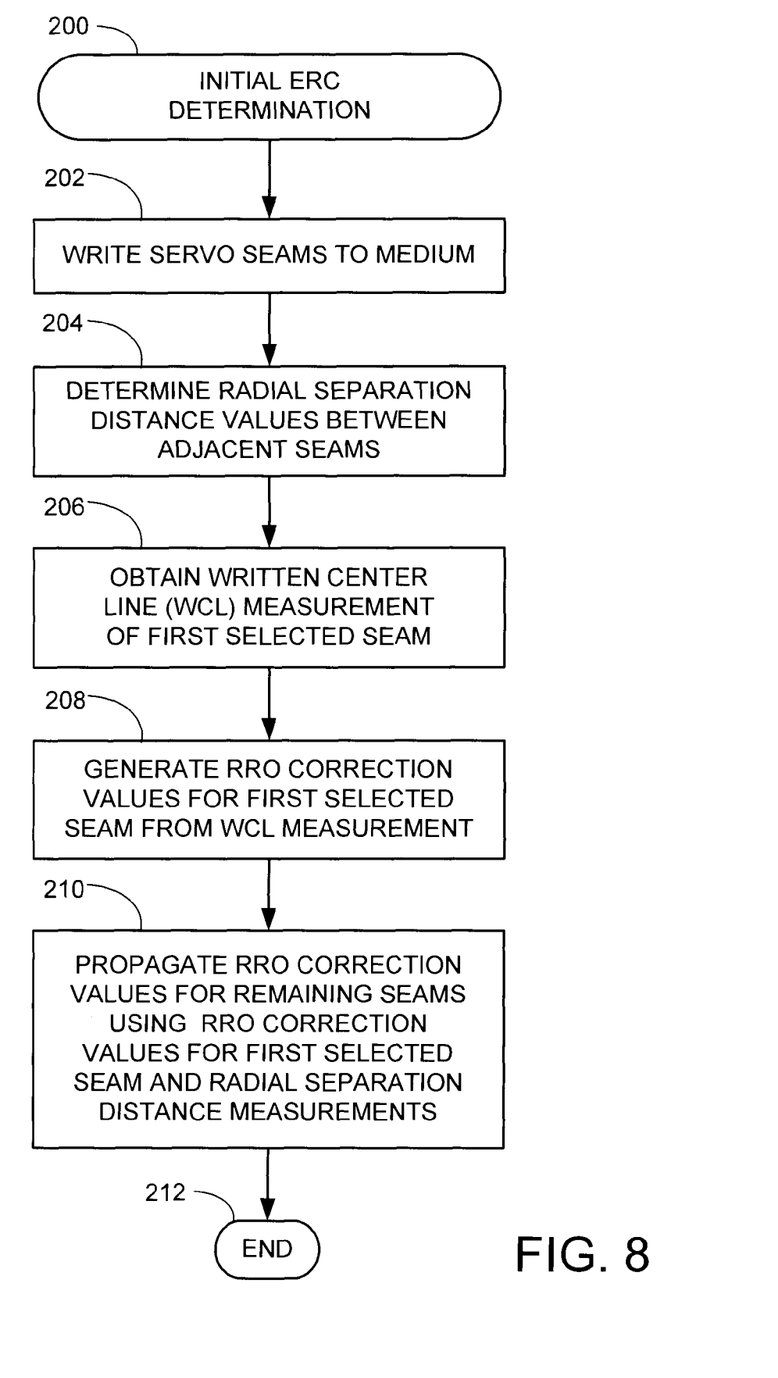
FIG. 8 is a flowchart illustrating a method for determining initial ERC values that are propagated across a storage medium.

FIG. 8 provides a flow chart for an INITIAL ERC DETERMINATION routine 200, illustrative of steps carried out in accordance with various embodiments of the present invention. It is contemplated that the routine 200 is carried out at a suitable time, such as during device manufacturing to generate an initial population of ERC values. Preferably, these initial ERC values are stored to the media (e.g., ERC fields 150, FIG. 3) for subsequent reference during the routine of FIG. 9, which will be discussed below.

Those skilled in the art will appreciate that any number of suitable approaches can be used to derive the initial ERC (repeated runout compensation) values, so that the routine of FIG. 8 is preferred but not required.

At step 202, the servo data are first formed on the associated recording surface. This can be carried out in a number of ways, such as in a self-servo write mode wherein a sequence of spirals are initially written to the surface using a servo track writer (STW), followed by the device 100 operating to incrementally write the servo wedges 136 while servoing on these spirals. During each pass, the servo dibit patterns (e.g., ABCD patterns 142-148) may be stitched together or trimmed by subsequent passes in order to establish a corresponding number of servo seams.

At step 204, radial separation distance values are determined between adjacent pairs of servo seams. The radial separation distance values are preferably characterized as WRO measurements, and are preferably taken across the radial width of the medium surface between each adjacent pair of servo seams. This can be carried out as discussed above, and will preferably result in the accumulation of WRO values on a per sector (wedge) basis, as set forth in FIGS. 5 and 7. The WRO measurement values are preferably stored in memory for subsequent recall, such as in data sectors on guard tracks of the medium 110 or in a separate memory location in a host system coupled to the device 100.

A written center line (WCL) for a selected seam on the medium is next determined at step 206. This can be carried out as discussed above to characterize the deviation of the path defined by the actual locations of the servo data at that general radius on the medium. Exemplary WCLs obtained during this step include 160 in FIG. 6 and 170 in FIG. 7.

At step 208, correction values for the selected seam are obtained to compensate for the RRO error in the WCL of step 206. Preferably, but not by limitation, the correction values are ERC values obtained as the negative of the WCL values. The ERC values obtained during step 208 are stored to an appropriate memory location, such as the ERC fields 150 in FIGS. 4-5 for the selected seam.

RRO correction values are next determined for a second servo seam on the medium at step 210. This is preferably carried out by determining a second correction value for the second servo seam adjacent the first seam in relation to the radial separation distance (e.g., $WRO_{12}$) and the first correction value for the first servo seam (e.g., the $ERC_1$ values).

Preferably, this process continues in a propagation operation whereby correction values are propagated to a number of remaining adjacent seams on the medium 110. For example, once the correction values (e.g., ERC2) are determined for the second seam, the correction values are further similarly determined for a third adjacent seam (e.g., $ERC_3 = ERC_2 + WRO_{23}$), and so on until the last seam is processed.

More generally, the preferred propagation operation of step 210 involves an additional population of X adjacent servo seams on the medium 110, so that an RRO correction value is determined for each servo seam Y in the population X in relation to the previously determined RRO correction value for an adjacent servo seam Y-1 (e.g., $ERC_{Y-1}$) and a radial distance value between said seams Y and Y-1 (e.g., $WRO_{Y-1, Y}$).

The first servo seam of step 208 can be at any suitable location, such as at a distal extent of the recording surface (i.e., adjacent an innermost diameter ID or an outermost diameter OD), or at a medial location of the surface. The propagation of correction values can then proceed across the medium in one, or both, radial directions (e.g., toward the ID, toward the OD, toward both, etc.).

The correction value propagation can also be carried out on a zone basis; for example, a plurality of concentric zones can be defined on the surface and an initial servo seam can be selected from each, enabling the correction values in each zone to be propagated from the initial seam. Multiple correction values can also be determined for the same seam from multiple propagation directions for both calibration and quality assurance verification. Such multiple correction values can also be averaged or otherwise combined to provide a final set of correction values. The routine then ends at step 212.

It will be appreciated that the initial ERC compensation values derived from FIG. 8 advantageously operate to reduce the effects of RRO error in the placement of the servo seams. However, further improvement in the ERC values are preferably obtained through subsequent operation of an ITERATIVE FEEDBACK ERC DETERMINATION routine 300 as set forth by FIG. 9.

Figure 9:
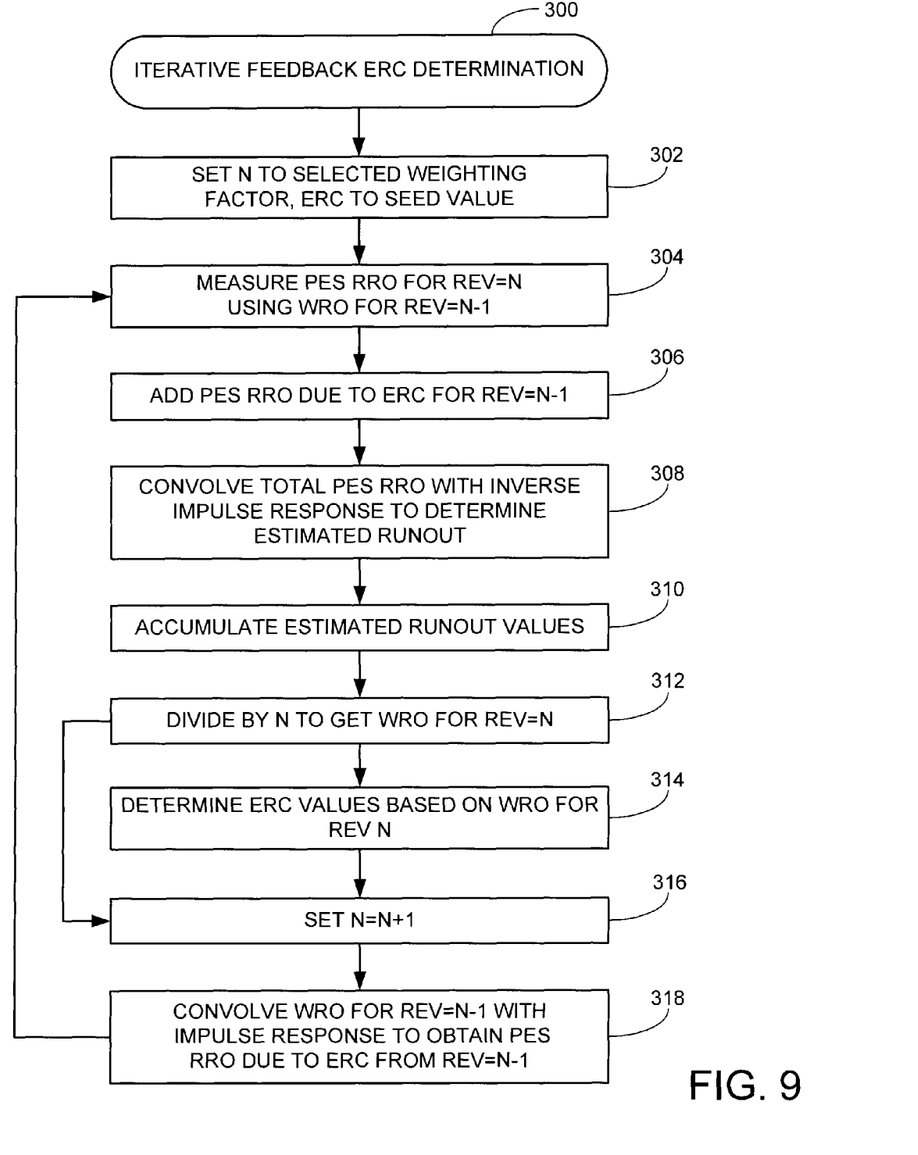
FIG. 9 is a flowchart illustrating a method for determining ERC values using feedback and predicted values.

The routine of FIG. 9 can be utilized at any suitable time, including during device manufacturing or subsequent field use. Generally, the routine of FIG. 9 adaptively iterates the initial ERC values from FIG. 8 to final values that obtain improved RRO compensation in an estimated position correction signal.

In FIG. 9, an accumulator is preferably initially set to the value derived from the initial ERC determination from FIG. 8. Since the WRO determination process can obtain an estimate of the spacing between seams in a single revolution of the medium 110, and since this information can be combined with the ERC correction of the previous seam to predict the ERC correction of the current seam, this calculated estimate may be used as a seed to the ERC process. The final ERC values of FIG. 9 will correct errors induced in the routine of FIG. 8.

For reference, one type of propagated error correctable by the routine of FIG. 9 is the low frequency relationships between adjacent seams. Since these low frequency terms are not generally included in the inverse impulse response, the low frequency content of the predicted ERC estimate may be carried forward into the ERC estimates obtained in FIG. 8. Such can be reduced or removed entirely, however, in the final ERC values obtained by FIG. 9.

With reference to FIG. 9, beginning at step 302 a suitable weighting value is selected for N, which is a count of media revolutions during the process. Preferably, N is set to some integral value other than 0. Generally, the predicted ERC estimate is multiplied by the weighting value to control the rate of convergence of the ERC correction process. A higher value, such as 2-4, will generally increase the rate of convergence. A value of N=1 may be used in order to provide the predicted ERC with equal weighting as the values obtained by the iterative process.

It will be recognized that if a higher initial value for N is used, say N=5, then the system will respond as if it were on the 5th revolution through the iterative process. An ERC value is also set at step 302 to the initial seed value previously determined during the operation of FIG. 8 for the associated seam under consideration.

At step 304, the PES RRO is measured for the initialized revolution of step 302 (e.g. REV=N where N was selected in step 302). The PES RRO is a position error signal with an RRO component and is generated by track following and measuring the position error associated with each wedge (sector) 136 along the associated track.

At step 306, the ERC seed values from step 302 are added to the PES values determined in step 304 on a sector-by-sector basis, which results in a total PES RRO that has values associated with each servo sector being corrected. That is, the seed ERC values previously loaded in step 302 are combined with the PES values in step 304 to provide the total, or compensated, PES RRO. At this point the total PES RRO will generally include RRO components not compensated by the then-existing ERC values. Of course, it is contemplated that these RRO components will ultimately be resolved by the iterative operation of FIG. 9 to provide final, updated ERC values.

An inverse impulse response of the servo system is separately determined in a suitable manner. For example, U.S. Pat. No. 6,549,362 generally discloses one method for determining the inverse impulse response for a servo control system by injecting or otherwise providing an impulse function into the servo control system and measuring the response of the servo control system.

This impulse response is preferably used at step 308 in that the total PES RRO from step 306 is convolved with the inverse impulse response using a circular convolution to derive estimated runout values associated with each servo sector along the track. The runout values are accumulated in the accumulator at step 310. The resulting sum in the accumulator is divided by the then-existing value of N to obtain a WRO value for revolution N of the medium at step 312. Updated ERC values are thereafter determined for the track at step 314 based upon the WRO for revolution N and are temporarily stored in a suitable memory.

At step 316, the value of N is incremented by one in preparation for obtaining ERC values for a next revolution of the medium. At step 318, a second circular convolution is made, this time of the WRO from step 312 using the impulse response of the servo system. This second convolution determines a PES RRO based on the most recently available ERC values.

As shown in FIG. 9, the process can be performed only once per seam, or can be repeated any number of additional times as required to arrive at the final ERC values (i.e., the final values obtained from step 314). If multiple passes are used, the process repeats until a decision is made that the total number of revolutions of the disk 108 for determining the ERC values with feedback has been met, or some other criteria has been satisfied (e.g., runout measurement, time spent on a track in question, etc.).

The final ERC values are stored in a suitable location within the device 100, such as in the ERC fields 150, a look-up table, etc. for future reference during normal device operation. The iterative feedback of FIG. 9 will generally drive error terms from PES non-linearities, gain errors modeling the inverse impulse response (or plant), low frequency components, etc. to substantially zero. Combining the initial values of the ERC in FIG. 8 with the iterative processing of FIG. 9 will result in tracks having a relatively low effective RRO and high coherency.

Figure 10:
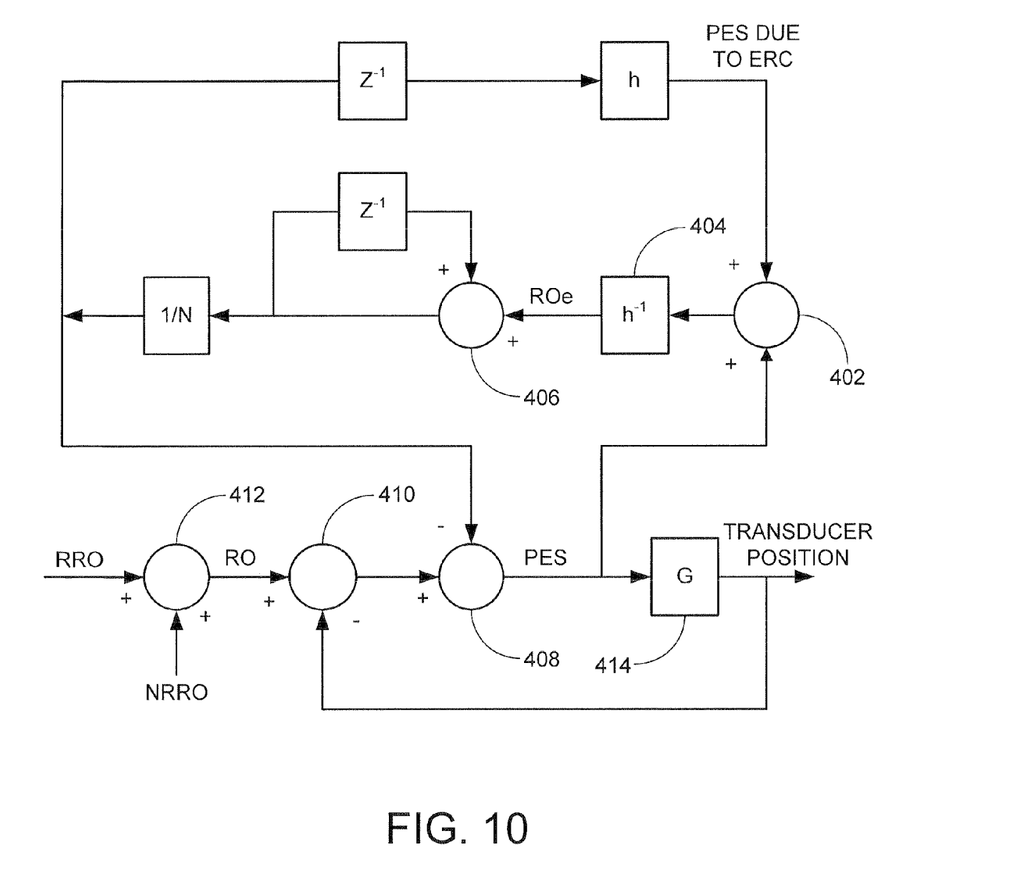
FIG. 10 is a block diagram illustrating logically the functionality of the method of FIG. 9.

FIG. 10 provides a block diagram illustrating logically the functionality of the method of FIG. 9. At junction 402 the PES due to the ERC is combined with the measured PES. Preferably, the PES due to the ERC will be the estimated or predicted value from the methods previously described. The result is preferably convolved with the inverse impulse response at 404.

At junction 406 the results are summed. Preferably the value for N will have been set to a non-zero value to provide a weighting to the estimated ERC.

At junction 408 the results from the iterative process or average are combined with the measured values of RRO and NRRO used to produced the total runout from junctions 410 and 412. Preferably the PES from this process is available to the servo control circuitry 414 for use in positioning the transducers 112 over the medium 110.

The logic described with respect to FIG. 10 and the methods described with respect to FIGS. 8-9 will preferably be implemented in the control circuitry, firmware, and/or software associated with the device 100. In a preferred embodiment, all or a portion of this functionality will occur in the servo controller 126.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A method comprising using a first repeatable runout (RRO) correction value for a first servo seam to propagate a second RRO correction value for an adjacent second servo seam, and updating the second RRO correction value to a final RRO correction value that removes a propagation error induced by the first RRO correction value.

2. The method of claim 1, wherein the second RRO correction value is determined in relation to a written center line of the second servo seam and a radial separation distance between the first and second servo seams.

3. The method of claim 2, wherein the final RRO correction value is determined by convolving a position error signal with an inverse impulse response of a servo system.

4. The method of claim 1, wherein the using step comprises writing the second RRO correction value to a field located along said second seam, and the updating step comprises overwriting the second RRO correction value with the final RRO correction value in said field.

5. The method of claim 1, wherein the first RRO correction value indicates an estimated radial distance between an actual radial location of the first servo seam and an ideal radial location of the first servo seam and is used by a servo system to position a transducer adjacent a storage medium.

6. The method of claim 1, wherein the second RRO correction value indicates an estimated radial distance between an actual radial location of the second servo seam and an ideal radial location of the second servo seam, and the updated RRO correction value removes an error in this estimated radial distance.

7. The method of claim 1, wherein a third RRO correction value is determined using the second RRO correction value, the third RRO value including a propagation error from the first RRO correction value.

8. The method of claim 1, further comprising a step of estimating a radial distance between the first and second servo seams, and determining the second RRO correction value in relation to this estimated radial distance.

9. The method of claim 1, wherein the first and second RRO correction values are respectively stored on a storage medium along the respective first and second servo seams as first and second embedded runout correction (ERC) values.

10. A method comprising:
generating a first repeatable runout (RRO) correction value to correct a radial displacement error in a first servo seam;
using the first RRO correction value to propagate a second RRO correction value for an adjacent second servo seam; and
adaptively iterating the second RRO correction value to a final RRO correction value to remove a propagation error induced by the first RRO correction value.

11. The method of claim 10, wherein the first and second RRO correction values are generated during manufacturing of a data storage device that incorporates a storage medium on which the first and second servo seams are formed.

12. The method of claim 10, wherein the final RRO correction value is generated with a weighted factor corresponding to a consecutive number of revolutions of a storage medium on which the first and second servo seams are formed.

13. The method of claim 12, wherein the weighted factor initially is set equal to a non-zero integer.

14. The method of claim 10, wherein the generating and using steps are carried out during manufacturing of a data storage device, and the adaptively iterating step is subsequently carried out during field use of the device.

15. The method of claim 10, wherein the second RRO correction value indicates an estimated radial distance between an actual radial location of the second servo seam and an ideal radial location of the second servo seam, and the final RRO correction value removes an error in this estimated radial distance.

16. An apparatus comprising a servo controller configured to position a transducer adjacent a rotatable storage medium in relation to a final repeatable runout (RRO) correction value, the servo controller generating said final RRO correction value by generating a first repeatable runout (RRO) correction value to correct a radial displacement error in a first servo seam, using the first RRO correction value to propagate a second RRO correction value for an adjacent second servo seam, and adaptively iterating the second RRO correction value to the final RRO correction value to remove a propagation error induced by the first RRO correction value.

17. The apparatus of claim 16, further comprising a memory for storing the estimated RRO value.

18. The apparatus of claim 16, wherein the servo controller is incorporated into a data storage device which also comprises said transducer and said rotatable storage medium.

19. The apparatus of claim 16, wherein the servo controller determines the second RRO correction value in relation to a written center line of the second servo seam and a radial separation distance between the first and second servo seams.

20. The apparatus of claim 16, wherein the final RRO correction value is determined by convolving a position error signal obtained from the second servo seam with an inverse impulse response of a servo system in which the servo controller is incorporated.

* * * * *